United States Patent [19]

Kobayashi et al.

[11] Patent Number: 5,043,200
[45] Date of Patent: Aug. 27, 1991

[54] RESIN COMPOSITION AND MOLDED PRODUCT THEREOF

[75] Inventors: Kazuhiro Kobayashi; Hifumi Kouguthi; Toshio Hara, all of Ichihara, Japan

[73] Assignee: Denki Kagaku Kogyo Kabushiki Kaisha, Tokyo, Japan

[21] Appl. No.: 447,620

[22] Filed: Dec. 8, 1989

[30] Foreign Application Priority Data

Dec. 21, 1988 [JP] Japan ................................ 63-320699

[51] Int. Cl.$^5$ ....................... B41M 1/30; C08L 67/02; C08L 53/02
[52] U.S. Cl. .................................. 428/195; 428/412; 525/67; 525/133; 525/146; 525/148
[58] Field of Search .................. 428/195, 412; 525/67, 525/133, 146, 148

[56] References Cited

U.S. PATENT DOCUMENTS 4,900,610 2/1990 Hochberg ........................... 525/444
4,900,784 2/1990 Tabankia .............................. 525/67

FOREIGN PATENT DOCUMENTS 0265139 4/1988 European Pat. Off. .
264045 11/1986 Japan .................................. 525/133

Primary Examiner—John C. Bleutge
Assistant Examiner—David Buttner
Attorney, Agent, or Firm—Oblon, Spivak, McClelland, Maier & Neustadt

[57] ABSTRACT

A resin composition comprising (A) from 10 to 90% by weight of a styrene resin; (B) from 10 to 90% by weight of a thermoplastic polyester resin; (C) from 1 to 80% by weight of an aromatic polycarbonate resin; and (D) from 1 to 80% by weight of an ethylene-ethyl acrylate copolymer resin.

9 Claims, No Drawings

RESIN COMPOSITION AND MOLDED PRODUCT THEREOF

The present invention relates to a resin composition comprising (A) a styrene resin, (B) a thermoplastic polyester rein, (C) an aromatic polycarbonate resin and (D) an ethylene-ethyl acrylate copolymer resin, and a molded product obtained from such a composition and having sublimation printing applied thereon. Such a composition has excellent impact resistance and suitable for application of sublimation printing, and thus particularly suitable for key tops such as push button keys of e.g. personal computers, word processors, type writers, telephone receivers or electric calculators, having letters, designs or symbols printed on their surface by sublimation printing.

As a method of forming letters, designs or symbols on the surface of key top molded products, it has been known to employ a printing method such as dry offset printing, silk screen printing or pad printing, or to employ a two color molding method wherein firstly the letters, designs or symbols are injection-molded with a molding material having a certain color and secondly a molding material having a different color is cast around the molded product of the first step to obtain a key top molded product. However, by the printing method, it is not possible to form letters, designs or symbols having adequate abrasion resistance, since ink is merely deposited on the molded product. On the other hand, the two color molding method requires the first and second molds, which lead to a high cost. Further, it is difficult to form complicated letters, designs or symbols, and there is a limit in making the wall thickness of the molded product thin, whereby the product is obliged to be very expensive. As a method for solving such problems, a sublimation printing method has been practically employed in which letters, designs or symbols are preliminarily printed on a transfer sheet by a printing method such as screen printing or pad printing by means of an ink having a sublimable dye incorporated, the printed transfer sheet is put on a molded key top product and subjected to heat pressing to let the dye in the ink penetrate and fix in the molded product, or a method has been employed in which letters, designs or symbols are printed directly on a molded product by pad printing or screen printing by means of the above-mentioned special ink, followed by heat treatment in e.g. a heating furnace to let the dye in the ink penetrate and fix in the molded product, and unnecessary ink component is washed away with a solvent. Such sublimation printing is excellent in the abrasion resistance since the dye thereby penetrates in the resin, and it presents a smooth key touch without protuberance due to deposition of ink. Further, complicated letters, designs or symbols of various types may readily be formed on the molded product, and the costs can be reduced. However, the type of the resin to be used for a molded product is limited. Namely, depending upon the type of the resin, the molded product is likely to undergo a deformation or distortion due to inadequate heat resistance of the resin, when subjected to heat treatment. Or, due to poor penetrability of the dye, there may be a case of inadequate durability due to an inadequate penetration degree of the dye. Otherwise, blurring of letters, designs or symbols may result due to diffusion of the dye. Therefore, the practical application is limited to a certain resin such as a polybutylene terephthalate resin or a polyethylene terephthalate resin. Even the polybutylene terephthalate resin or the polyethylene terephthalate resin has a difficulty in molding, since such a resin is a crystalline polymer. Further, if the crystalline state of the molded product is not consistent, the color hue of the molded products after the penetration of ink differs, whereby it may happen that colors of the adjacent keys on a key board are different from each other, thus presenting an ugly outer appearance.

Further, it has been proposed to incorporate other resin such as an ABS resin to a polyalkylene terephthalate resin such as a polybutylene terephthalate or a polyethylene terephthalate resin, and printing is applied to its molded product (Japanese Unexamined Patent Publication No. 98482/1988). However, such a method has the above-mentioned problems, and the heat stability will be poor if the polyalkylene terephthalate and the ABS resin are merely mixed, whereby it is very difficult to obtain a molded product. Further, the obtained molded product tends to be inadequate in the heat resistance, the impact resistance, the flexural strength, etc. Further, when a key top is transfer-printed, an emboss on the surface is likely to disappear, or in a test wherein a key top printed product is coated with cosmetics, blurring is likely to result. Therefore, it has been desired to develop a resin having adequate mechanical, physical and chemical properties and which is suitable for practical use.

Further, as a method for forming letters, designs or symbols on the surface of a molded key top product, a printing method such as silk screen printing or pad printing is presently available to obtain key tops for office automation equipments, which do not require so much abrasion resistance. The resin material presently used for such a method is an ABS resin, and a polyalkylene terephthalate resin such as a polybutylene terephthalate resin or a polyethylene terephthalate resin, is not used, because the ink used for silk screen printing or pad printing has poor adhesive strength to a molded product of a polyalkylene terephthalate resin, and the printed ink layer tends to be easily peeled off from the resin surface. Such a polyalkylene terephthalate resin is a crystalline resin, whereby spherical crystals on the surface of the resin are not dissolved by a solvent in the ink, as is different from the non-crystalline ABS resin, and no adequate adhesive strength is created. If a resin is available which has the transfer printing properties as mentioned before and the above-mentioned printing adhesive strength, all of the presently available printing methods such as transfer printing, silk screen printing and tampo printing can be used for key tops molded from such a resin, whereby it will be unnecessarily to select a resin depending upon the printing method, and it will be possible to reduce a number of processing steps.

The present inventors have conducted extensive researches to solve the above-mentioned problems and to obtain a resin composition and a molded product suitable for sublimation printing, and as a result, they have found that the following resin composition has excellent physical properties and suitable for sublimation printing. The present invention has been accomplished on the basis of this discovery.

The present invention provides a resin composition comprising:

(A) from 10 to 90% by weight of a styrene resin;

(B) from 10 to 90% by weight of a thermoplastic polyester resin;

(C) from 1 to 80% by weight of an aromatic polycarbonate resin; and (D) from 1 to 80% by weight of an ethylene-ethyl acrylate copolymer resin.

Now, the present invention will be described in detail with reference to the preferred embodiments.

The styrene resin (A) to be used in the present invention is a styrene polymer or a styrene copolymer, such as, an acrylonitrile-butadiene-styrene (ABS) resin, an acrylonitrile-styrene (AS) resin, a methyl methacrylate-butadiene-styrene (MBS) resin, an acrylonitrile-EPDM-styrene (AES) resin, a butadiene-styrene (HIPS) resin or a polystyrene resin. A part or whole of the styrene moiety of these resins is commonly substituted by α-methylstyrene or N-phenylmaleimide. Also in the case of the composition of the present invention, such a modified styrene resin may be employed. These resins may be used alone or in combination as a mixture of two or more different types.

The thermoplastic polyester resin (B) to be used in the present invention is a homopolyester or a copolyester obtained by polycondensation of a dicarboxylic acid compound with a dihydroxy compound, by polycondensation of an oxycarboxylic acid compound, or by polycondensation of a mixture of these three components. It is preferably a polyalkylene terephthalate, and polybutylene terephthalate and polyethylene terephthalate may be used alone or in combination as a mixture, to exhibit remarkable effects.

The aromatic polycarbonate resin (C) to be used in the present invention can be prepared by the reaction of a bivalent phenol with phosgene or with carbonic acid diester. The bivalent phenol is preferably a bisphenol, particularly, 2,2-bis(4-hydroxyphenyl)propane. The aromatic polycarbonate is selected from a homopolymer of a bivalent phenol, a copolymer of at least two bivalent phenols and a copolymer obtained by substituting a part of carbonic acid by other dibasic acid (such as terephthalic acid or isophthalic acid), but two or more different types may be used in combination.

The ethylene-ethyl acrylate copolymer resin (D) to be used in the present invention is a resin obtained by randomly copolymerizing ethylene and ethyl acrylate. The weight ratio of ethylene to ethyl acrylate is usually from 95:5 to 5:90, preferably from 90:10 to 20:80, more preferably from 80:20 to 30:70. Particularly preferred from the viewpoint of the impact strength of the resin composition of the present invention containing this component, is within a range of from 75:25 to 40:60.

Here, the ethylene-ethyl acrylate copolymer resin may be copolymerized with other component if the amount of latter is not higher than 10% by weight. As such other component, N-phenylmaleimide, maleic anhydride and methyl methacrylate may be mentioned. A particularly preferred component is maleic anhydride. Namely, particularly preferred is an ethylene-ethyl acrylate copolymer containing not more than 10% of maleic anhydride. The resin composition of the present invention having such a maleic anhydride-containing ethylene-ethyl acrylate copolymer resin incorporated, has excellent impact strength and resin coloring properties.

The present invention is characterized in that sublimation printing can be applied to a molded product of a composition comprising the above-mentioned styrene resin (A), the thermoplastic polyester resin (B), the aromatic polycarbonate resin (C) and the ethylene-ethyl acrylate copolymer resin (D) to obtain a molded product having excellent sublimation printing applied thereto. To obtain such a molded product, the blending ratio of the respective components is styrene resin (A)/thermoplastic polyester resin (B)/aromatic polycarbonate resin (C)/ethylene-ethyl acrylate copolymer resin (D)=10-90/10-90/1-80/1-80 (% by weight), preferably 20-80/20-80/1-60/1-60 (% by weight), more preferably 20-70/20-70/1-50/1-50 (% by weight), particularly 20-60/20-60/1-40/1-40 (% by weight).

In the present invention, conventional additives and/or fillers may be added to the composition constituting the molded product to such an extent that sublimation printing is not substantially impaired. For example, such additives and fillers include crystallization accelerators, antioxidants, various stabilizers, lubricants, plasticizers, releasing agents, antistatic agents and surfactants, such as talc, gypsum, silica, calcium titanate, calcium carbonate, alumina, titanium dioxide, finely pulverized metal, glass powder, carbon black, graphite, polyolefin, an ionomer resin, calcium benzoate, magnesium stearate and teflon. There is no particular restriction as to the method for preparing the composition of the present invention, and the composition can be prepared by a method commonly employed. For example, all of the components may be mixed at once, then melt-kneaded and pelletized by an extruder, followed by molding.

Likewise, there is no particular restriction as to the sublimation printing method in the present invention. Namely, it is possible to employ a method wherein letters, designs or symbols are printed on a transfer printing sheet by means of a special ink having sublimable dye incorporated, and then the printed transfer printing sheet is placed on a molded product, followed by heat pressing to let the dye in the ink penetrate and fix in the molded product, or a method wherein letters, designs or symbols are directly printed on a molded product with the above-mentioned ink by a method such as pad printing or screen printing, followed by heating in e.g. a heating furnace for fixing.

Now, the present invention will be described in further detail with reference to Examples. However, it should be understood that the present invention is by no means restricted to such specific Examples. The sublimation printing method and the test methods used in the following Examples and Comparative Examples, are as follows:

(1) For pelletizing, pellets were prepared by means of a single screw extruder with a vent (VC-40, manufactured by Kabushiki Kaisha Chuo Kikai Seisakusho).

(2) Using the pellets thus obtained, a molded product was prepared, and the physical properties were evaluated. At the same time, a molded product for testing sublimation printing properties was prepared.

(3) Test pieces for evaluation of sublimation printing properties.

Transfer printing was conducted using the following molded key top products, each being an embossed key top.

| Key tops | Dimensional size |
|---|---|
| 1.00 size key | 18 · 18 · 7 mm |

(4) Sublimation printing method

A pattern composed of letters or symbols is silk screen printed on a glasine paper as a base material with an ink containing a heat transferable dye to obtain a transfer printing sheet. The transfer printing sheet is placed on a molded key top product preheated in an atmosphere of about 150° C. for 120 seconds, and a heat resistant rubber pad heated to 180° C. was pressed thereon for 60 seconds to let the dye penetrate and fix in the molded product.

(5) Test methods i) Appearance and quality of printed letters

The appearance and quality of letters printed by subrimation printing, were observed visually and with a magnifying glass immediately after the subrimation printing and after the molded key top product printed by subrimation printing was left to stand in a constant temperature and constant humidity tank at 75° C. under a relative humidity of 95% for 240 hours and evaluated by standards of from 1 to 5 grades. Relative to the width of the printed letter, the one having blurring of not more than 20% of the width of the letter was evaluated as grade 1, the one having blurring of not more than 40% was evaluated as grade 2, the one having blurring of not more than 60% was evaluated as grade 3, the one having blurring of not more than 80% was evaluated as grade 4, and the one having blurring exceeding 80% was evaluated as grade 5.

ii) Degree of penetration

The key top printed by subrimation printing was immersed in liquefied nitrogen to lower the temperature to a level lower than Tg of the key top resin material, whereupon the key top was broken at the portion of the printed letters, symbols and designs, and the cross section was observed by a universal tool microscope TUM-200BD (manufactured by Tokyo Kogaku Kikai K.K.) and the degree of penetration of the ink was read. The one having a degree of penetration of at least 30 μm was evaluated as grade A, the one having a degree of penetration of less than 30 μm and at least 20 μm was evaluated as grade B, the one having degree of penetration of less than 20 μm and at least 10 μm was evaluated as grade C, and the one having a degree of penetration of less than 10 μm was evaluated as grade D.

iii) Change of the resin surface

A change of the embossed surface of the key top surface was observed when the key top surface having the transfer printing sheet placed thereon was pressed by the heat resistant rubber pad. The one in which no change was observed in the embossed state by the transfer printing was evaluated as grade A, the one in which a change in the embossed state was observed only when carefully imspected, was evaluated as grade B, and the one in which a change in the embossed state was distinct, was evaluated as grade C, the one in which the embossed state changed to such an extent that the emboss disappeared, was evaluated as grade D. The one in which the embossed state changed so that the emboss disappeared and a molten state appeared, was evaluated as grade E.

iv) Abrasion resistance of the printed portion

A sand-containing eraser No. 201 for an electric eraser manufactured by Lyon Jimuki K.K. was reciprocated on the printed surface under a load of 350 g, whereby the one which required more than 5,000 reciprocations till a part of printed letter was erased, was evaluated as grade A, the one which required less than 5,000 and at least 3,000 reciprocations, was evaluated as grade B, the one which required less than 3,000 and at least 1,000 reciprocations, was evaluated as grade C, and the one which required less than 1,000 reciprocations, was evaluated as grade B.

v) Resistance against cosmetics

The following cosmetics were coated on the entire key top surface printed by subrimation printing and left to stand in a constant temperature and constant humidity tester at 40° C. under a relative humidity of 95% for 240 hours. Then, the key top was taken out from the tester, and the surface was wiped with a gauze whereupon the resistance against cosmetics was evaluated under the following standards. Namely, the one wherein the ratio of the blurred portion to the width of the letter, a symbol or the design on the key top surface, was not more than 10%, was evaluated as grade 1, the one in which such a proportion was not more than 20%, was evaluated as grade 2, the one in which such a ratio was not more than 40%, was evaluated as grade 3, the one wherein such a ratio was not more than 80%, was evaluated as grade 4, and the one in which such a ratio exceeded 80%, was evaluated as grade 5.

Cosmetics:

1. Nivea handcream (manufactured by Kao Corporation)
2. Keri Lotion (manufactured by WESTWOOD PHARMACEUTICALS INC.)

vi) Adhesive properties of ink by pad printing

Pad printing was applied to the surface of a key top using a R-type ink manufactured by Tampo Print Company and the ink-printed surface thus obtained was subjected to a cross cut test in accordance with JIS K-5400. The evaluation points were as follows.

| Evaluation points | Evaluation points in cross cut test State of scars |
|---|---|
| 10 | Each scar is fine and smooth at both sides, and no peeling is observed at the intersection of scars and at each square defined by cut lines. |
| 8 | Slight peeling is observed at the intersection of scars, and no peeling is observed in each square defined by cut lines. The area of missing portions is not more than 5% of the total square area. |
| 6 | Peeling is observed at both sides of a scar and at the intersection of scars, and the area of missing portions is within a range of from 5 to 15% of the total square area. |
| 4 | The width of peeling due to scars is wide, and the area of missing portions is within a range of from 15 to 35% of the total square area. |
| 2 | The width of peeling due to scars is wider than the width of point 4, and the area of missing portions is within a range of from 35 to 65% of the total square area. |
| 0 | The area of peeling is more than 65% of the square area. |

EXAMPLES 1 TO 7 AND COMPARATIVE EXAMPLES 1 TO 8

Various compositions of styrene resins are shown in Table 1, in which the numerical values indicate % by weight. The styrene resin identified by A-1 in Table 1, a polybutylene terephthalate (PBT) resin having an intrinsic viscosity of 0.76, an aromatic polycarbonate (PC) resin having a weight average molecular weight of 20,000 and an ethylene-ethyl acrylate copolymer (EEA) resin having an ethylene/ethyl acrylate ratio of 70/30 and having 5% by weight of maleic anhydride copolymerized thereto, were blended and pelletized at the proportions as identified in Table 2. Then, a part of the pellets was used for measuring the physical properties, and the rest was injection-molded to obtain test pieces (key tops). Subrimation printing was applied to the test pieces, and evaluation tests were conducted. As Comparative Examples, single use of each of the styrene resin, the PBT resin, the PC resin and the EEA resin, and two component blends thereof were tested in a similar manner. The results are shown in Table 2.

EXAMPLES 8 TO 11 AND COMPARATIVE EXAMPLES 9 TO 12

By using styrene resins A-2 to A-5 as identified in Table 1, treatment and evaluation tests were conducted in the same manner as in Example 1. For the purpose of comparison, compositions from which one of the styrene resin, the PBT resin, the PC resin and the PEA resin was missing, were prepared and evaluated.

The compositions and the test results are shown in Table 3.

TABLE 1

| | Composition | | | | | |
|---|---|---|---|---|---|---|
| Sample No. | Styrene | α-Methyl styrene | Polybutadiene rubber | Acrylo-nitrile | Methyl methacrylate | N-Phenyl maleimide |
| A-1 | 38 | 0 | 50 | 12 | 0 | 0 |
| A-2 | 50 | 0 | 15 | 35 | 0 | 0 |
| A-3 | 45 | 10 | 30 | 15 | 0 | 0 |
| A-4 | 35 | 0 | 40 | 15 | 10 | 0 |
| A-5 | 33 | 0 | 30 | 12 | 0 | 25 |

TABLE 2

| | Examples | | | | | | | Comparative Examples | | | | | | |
|---|---|---|---|---|---|---|---|---|---|---|---|---|---|---|
| | 1 | 2 | 3 | 4 | 5 | 6 | 7 | 1*2 | 2 | 3 | 4*3 | 5 | 6 | 7 |
| Composition | | | | | | | | | | | | | | |
| Type of styrene resin | A-1 | A-1 | A-1 | A-1 | A-1 | A-1 | A-1 | A-1 | — | — | — | A-1 | — | — |
| Wt % of styrene resin | 5 | 10 | 35 | 50 | 70 | 30 | 30 | 100 | — | — | — | 50 | — | 50 |
| Wt % of PBT resin | 80 | 75 | 50 | 35 | 15 | 40 | 40 | — | 100 | — | — | 50 | 50 | — |
| Wt % of PC resin | 10 | 10 | 10 | 10 | 10 | 25 | 5 | — | — | 100 | — | — | 50 | 50 |
| Wt % of EEA resin | 5 | 5 | 5 | 5 | 5 | 5 | 25 | — | — | — | 100 | — | — | — |
| Physical property | | | | | | | | | | | | | | |
| Impact strength*1 (kg/cm²) | 5.2 | 5.9 | 7.2 | 6.8 | 5.4 | 9.3 | 8.9 | — | 1.8 | 70 | — | 2.1 | 3.2 | 38 |
| Test results | | | | | | | | | | | | | | |
| Appearance and quality of letters immediately after subrimation printing | 1 | 1 | 1 | 1 | 1 | 1 | 1 | — | 1 | 3 | — | 1 | 1 | 3 |
| Appearance and quality of letters after high humidity heat treatment | 2 | 2 | 1 | 1 | 1 | 1 | 1 | — | 3 | 4 | — | 1 | 1 | 5 |
| Change of the resin surface | A | A | A | A | B | B | A | — | A | A | — | C | C | A |
| Abrasion resistance | A | A | B | B | B | B | B | — | A | D | — | B | B | B |
| Degree of penetration | A | A | A | A | B | A | A | — | A | C | — | A | A | C |
| Cosmetics resistance | 1 | 1 | 1 | 1 | 2 | 1 | 1 | — | 3 | 2 | — | 2 | 1 | 5 |

*1 Measured in accordance with ASTM D-256
*2 and *3 Under the heat treatment conditions for subrimation printing, the deformation was so great that it was impossible to obtain practical samples.

TABLE 3

| | Examples | | | | Comparative Examples | | | |
|---|---|---|---|---|---|---|---|---|
| | 8 | 9 | 10 | 11 | 9 | 10 | 11 | 12 |
| Composition | | | | | | | | |
| Type of styrene resin | A-2 | A-3 | A-4 | A-5 | A-3 | A-3 | A-3 | A-3 |
| Wt % of styrene resin | 35 | 35 | 35 | 35 | — | 85 | 40 | 37.5 |
| Wt % of PBT resin | 50 | 50 | 50 | 50 | 85 | — | 55 | 52.5 |
| Wt % of PC resin | 10 | 10 | 10 | 10 | 10 | 10 | — | 10 |
| Wt % of EEA resin | 5 | 5 | 5 | 5 | 5 | 5 | 5 | — |
| Physical property | | | | | | | | |
| Impact strength*1 (kg/cm²) | 4.5 | 5.6 | 6.1 | 4.3 | 2.0 | 15.9 | 3.1 | 2.7 |
| Test results | | | | | | | | |
| Appearance and quality of letters immediately after subrimation printing | 1 | 1 | 1 | 1 | 1 | 1 | 1 | 1 |
| Appearance and quality of letters after high humidity heat treatment | 1 | 1 | 1 | 1 | 2 | 4 | 1 | 1 |
| Change of the resin surface | A | A | A | A | A | C | C | A |
| Abrasion resistance | A | A | A | A | A | C | B | B |
| Degree of penetration | A | A | A | A | A | D | B | B |

TABLE 3-continued

|  | Examples | | | | Comparative Examples | | | |
| --- | --- | --- | --- | --- | --- | --- | --- | --- |
|  | 8 | 9 | 10 | 11 | 9 | 10 | 11 | 12 |
| Cosmetics resistance | 1 | 1 | 1 | 1 | 3 | 5 | 3 | 2 |

*[1] Measured in accordance with ASTM D-256

EXAMPLES 12-17 AND COMPARATIVE EXAMPLES 13 TO 16

By using a polyethylene terephthalate (PET) resin having an intrinsic viscosity of 0.72, the styrene resin, the PC resin and the EEA resin as identified in Table 1, treatment and evaluation tests were conducted in the same manner as in Examples 1 to 7. The results are shown in Table 4 together with the results of Comparative Examples.

EXAMPLES 18 TO 20 AND COMPARATIVE EXAMPLES 17 TO 22

By using the same styrene resin, PBT resin, PC resin and EEA resin as used in Example 1, treatment and evaluation tests were conducted in the same manner as in Example 1 with the compositions as identified in Table 5. For the purpose of comparison, an ABS resin (Saikorack GSM, manufactured by Ube Kosan K.K.) was incorporated to the PBT resin having an intrinsic viscosity of 0.75, and evaluation tests were conducted in a similar manner. The results are shown in Table 5.

TABLE 4

|  | Examples | | | | | | Comparative Examples | | | |
| --- | --- | --- | --- | --- | --- | --- | --- | --- | --- | --- |
|  | 12 | 13 | 14 | 15 | 16 | 17 | 13 | 14 | 15 | 16 |
| Composition | | | | | | | | | | |
| Type of styrene resin | A-1 | A-1 | A-1 | A-1 | A-3 | A-5 | — | A-1 | A-1 | A-1 |
| Wt % of styrene resin | 5 | 35 | 70 | 30 | 35 | 35 | — | 50 | 40 | 37.5 |
| Wt % of PBT resin | 80 | 50 | 15 | 40 | 50 | 50 | 100 | 50 | 55 | 52.5 |
| Wt % of PC resin | 10 | 10 | 10 | 25 | 10 | 10 | — | — | — | 10 |
| Wt % of EEA resin | 5 | 5 | 5 | 5 | 5 | 5 | — | — | 5 | — |
| Physical property | | | | | | | | | | |
| Impact strength*[1] (kg/cm$^2$) | 4.9 | 8.7 | 5.3 | 6.3 | 5.1 | 5.7 | 2.0 | 2.6 | 5.4 | 4.8 |
| Test results | | | | | | | | | | |
| Appearance and quality of letters immediately after subrimation printing | 1 | 1 | 1 | 1 | 1 | 1 | 1 | 1 | 1 | 1 |
| Appearance and quality of letters after high humidity heat treatment | 2 | 1 | 2 | 1 | 1 | 1 | 3 | 1 | 1 | 1 |
| Change of the resin surface | A | A | B | B | A | A | A | B | B | C |
| Abrasion resistance | A | A | B | B | B | B | A | B | B | B |
| Degree of penetration | A | A | B | A | A | A | A | A | A | A |
| Cosmetics resistance | 1 | 1 | 2 | 1 | 1 | 1 | 4 | 3 | 3 | 1 |

*[1] Measured in accordance with ASTM D-256

TABLE 5

|  | Examples | | | Comparative Examples | | | | | |
| --- | --- | --- | --- | --- | --- | --- | --- | --- | --- |
|  | 18 | 19 | 20 | 17 | 18 | 19 | 20 | 21 | 22 |
| Composition | | | | | | | | | |
| Type of styrene resin | A-1 | A-1 | A-1 | ABS (Saikorac GSM) | ABS | ABS | ABS | ABS | ABS |
| Wt % of styrene resin | 38 | 38 | 35 | 5 | 10 | 30 | 50 | 70 | 100 |
| Wt % of PBT resin | 56 | 55 | 52 | 95 | 90 | 70 | 50 | 30 | — |
| Wt % of PC resin | 3 | 3 | 8 | — | — | — | — | — | — |
| Wt % of EEA resin | 3 | 3 | 4 | — | — | — | — | — | — |
| Silicon oil (%) | — | 1 | 1 | — | — | — | — | — | — |
| Physical property | | | | | | | | | |
| Impact strength*[1] (kg/cm$^2$) | 6.7 | 6.9 | 6.2 | 4.5 | 2.9 | 2.5 | 2.4 | 2.0 | 27.0 |
| Test results | | | | | | | | | |
| Appearance and quality of letters immediately after subrimation printing | 1 | 1 | 1 | 1 | 1 | 1 | 1 | 3 | 5 |
| Appearance and quality of letters after high humidity heat treatment | 1 | 1 | 1 | 3 | 2 | 1 | 1 | 1 | 5 |
| Change of the resin surface | A | A | A | A | B | B | D | E | E |
| Abrasion resistance | A | A | A | A | B | C | C | C | D |
| Degree of penetration | A | A | A | B | C | C | D | D | D |
| Cosmetics resistance | 1 | 1 | 1 | 5 | 5 | 5 | 1 | 1 | 1 |
| Adhesiveness of pad | 10 | 10 | 10 | 0 | 0 | 4 | 6 | 8 | 10 |

TABLE 5-continued

| | Examples | | | Comparative Examples | | | | | |
|---|---|---|---|---|---|---|---|---|---|
| | 18 | 19 | 20 | 17 | 18 | 19 | 20 | 21 | 22 |
| printing ink | | | | | | | | | |

*¹Measured in accordance with ASTM D-256

It is evident from the above Examples and Comparative Examples that the composition of the present invention comprising the styrene resin, the thermoplastic polyester resin, the aromatic polycarbonate resin and the ethylene-ethyl acrylate copolymer resin, is superior in the physical properties to the two component composition comprising the aromatic polycarbonate resin and the thermoplastic polyester resin or the two component composition comprising the styrene resin and the thermoplastic polyester resin or the three component composition comprising the styrene resin, the thermoplastic polyester resin and the aromatic polycarbonate resin. Also with respect to the sublimation printing characteristics, the molded product of the composition of the present invention printed by subrimation printing, has a change of the printed resin surface substantially less than the two component composition comprising the styrene resin and the thermoplastic polyester resin, and shows little blurring of ink due to cosmetics applied thereto. Further, it has less blurring of ink due to cosmetics applied thereto as compared with the two component composition comprising the aromatic polycarbonate resin and the thermoplastic polyester resin. Furthermore, it provides excellent adhesiveness by a pad printing method. As a result, blurring of ink is very little even when subjected to high humidity heat treatment, and it is possible to obtain a molded product printed by sublimation printing excellent also in the abrasion resistance. It is also suitable for a pad printing method.

We claim:

1. A molded product having sublimation printing applied on a substrate of a resin composition comprising:
   (A) from 10 to 90% by weight of a styrene resin;
   (B) from 10 to 90% by weight of a thermoplastic polyester resin;
   (C) from 1 to 80% by weight of an aromatic polycarbonate resin; and
   (D) from 1 to 80% by weight of an ethylene-ethyl acrylate copolymer resin.

2. The molded product according to claim 1, wherein the styrene resin is selected from the group consisting of an ABS resin, an AS resin, a MBS resin, an AES resin, a HIPS resin and a polystyrene resin.

3. The molded product according to claim 1, wherein the thermoplastic polyester resin is a polyalkylene terephthalate.

4. The molded product according to claim 1, wherein the thermoplastic polyester resin is polybutylene terephthalate, polyethylene terephthalate or a mixture thereof.

5. The molded product according to claim 1, wherein the aromatic polycarbonate resin is a reaction product of a bivalent phenol with phosgene or with carbonic acid diester.

6. The molded product according to claim 5, wherein the bivalent phenol is a bisphenol.

7. The molded product according to claim 5, wherein the bivalent phenol is 2,2-bis(4-hydroxyphenyl)propane.

8. The molded product according to claim 1, wherein the ethylene-ethyl acrylate copolymer resin is a random copolymer of ethylene with ethyl acrylate in a weight ratio of from 95:5 to 5:90.

9. A key top molded from a resin composition having sublimation printing applied to its surface, said resin composition comprising:
   (A) from 10 to 90% by weight of a styrene resin;
   (B) from 10 to 90% by weight of a thermoplastic polyester resin;
   (C) from 1 to 80% by weight of an aromatic polycarbonate resin; and
   (D) from 1 to 80% by weight of an ethylene-ethyl acrylate copolymer resin.

* * * * *